US012334296B1

(12) United States Patent
Gao

(10) Patent No.: US 12,334,296 B1
(45) Date of Patent: Jun. 17, 2025

(54) PROCESS FOR FABRICATING HIGH CURRENT FIELD EMISSION CATHODE CONTAINING NANOMATERIALS

(71) Applicant: A&M Consulting, LLC, Morrisville, NC (US)

(72) Inventor: Bo Gao, Morrisville, NC (US)

(73) Assignee: A&M Consulting, LLC

( * ) Notice: Subject to any disclaimer, the term of this patent is extended or adjusted under 35 U.S.C. 154(b) by 0 days.

(21) Appl. No.: 18/680,888

(22) Filed: May 31, 2024

Related U.S. Application Data

(60) Provisional application No. 63/517,512, filed on Aug. 3, 2023.

(51) Int. Cl.

| | |
|---|---|
| ***H01J 1/88*** | (2006.01) |
| ***H01J 1/304*** | (2006.01) |
| ***H01J 9/02*** | (2006.01) |

(52) U.S. Cl.
CPC .............. *H01J 1/3048* (2013.01); *H01J 1/88* (2013.01); *H01J 9/025* (2013.01)

(58) Field of Classification Search
CPC ..................................................... H01J 1/3048
USPC .......................................................... 313/311
See application file for complete search history.

(56) References Cited

U.S. PATENT DOCUMENTS

| | | | | |
|---|---|---|---|---|
| 2005/0153618 A1* | 7/2005 | Kuo | H01J 9/025 427/372.2 |
| 2012/0007490 A1* | 1/2012 | Liu | H01J 1/3044 313/306 |
| 2012/0177887 A1* | 7/2012 | Inoue | H01J 9/025 428/156 |
| 2016/0013007 A1* | 1/2016 | Du | H01J 3/021 445/51 |

FOREIGN PATENT DOCUMENTS

| | | | |
|---|---|---|---|
| CN | 102208317 A * | 10/2011 | H01B 1/24 |
| JP | 2005302607 A * | 10/2005 | |

* cited by examiner

*Primary Examiner* — Christopher M Raabe
(74) *Attorney, Agent, or Firm* — Rimon PC

(57) ABSTRACT

High current field emission cathodes containing nanomaterials, and methods for their production, are provided. An exemplary method comprises forming an electrically resistive layer on a cathode substrate, forming an adhesion promoting layer on the electrically resistive layer, and forming an electron emissive layer including nanomaterials on the adhesion promoting layer. Forming each layer can include depositing a suitable mixture followed by a heating process including three firing cycles. Deposition can be performed by electrophoretic deposition or a printing technique. The layers can be patterned to form islands separated by well-defined gaps on the substrate.

19 Claims, 13 Drawing Sheets

PROCESS FOR FABRICATING HIGH CURRENT FIELD EMISSION CATHODE CONTAINING NANOMATERIALS

CROSS-REFERENCE TO RELATED APPLICATIONS

This application claims the benefit of U.S. Provisional Application No. 63/517,512 filed on Aug. 3, 2023, which is incorporated herein by reference.

BACKGROUND OF THE INVENTION

Field of the Invention

The present invention is directed to the field of high current field emission cathodes and more particularly to high current field emission cathodes based on nanomaterials.

Description of the Prior Art

Nanomaterials, especially carbon nanotubes (CNTs), are known to have excellent electron field emission properties due to their unique structure, outstanding mechanical strength, excellent electric and thermal conductivity, superb thermal stability, and good chemical stability. CNTs have very low electron emission threshold fields (1~2V/μm) and can emit electrons at very high current densities. Electron emitting currents as high as 0.2 mA have been drawn from a single CNT in the laboratory.

Due to their superb field emission properties, tremendous efforts have been made in the past few decades to develop novel vacuum electronic devices based on CNT field emitters. For example, CNT-based Multi-Beam X-Ray (MBX) tubes enable stationary X-ray scanners for medical and security applications, which provide significant advantages over the conventional rotating gantry X-ray systems on the market today. These advantages include higher energy efficiency, higher imaging resolution, faster scanning, smaller system footprints, improved safety, reduced system acquisition and maintenance costs, etc. Traveling wave tubes (TWTs) are key components for high frequency and high-power communications, such as for radar and electronic warfare. TWTs in active service today use thermal cathodes as electron sources. The heat generated by a thermionic cathode is difficult to dissipate, significantly limiting the efficiency, current density, and lifetime of the TWT. A TWT without a cathode requiring heating would overcome all of technical difficulties mentioned above. Payload weight may be lowered because high current, high voltage transformers would not be needed. Such a TWT could also operate instantaneously. The beam current would be modulated directly at the cathode and focusing electron beams would become much easier.

Despite decades of research and development, the above-mentioned field emission devices are still at a prototyping stage. Their commercial success is mostly hindered by technical challenges in producing high current CNT cathodes. Although extremely high current densities (>1000 A/cm$^2$) can be achieved from a single CNT in the laboratory, high current densities cannot be readily obtained in the macroscopic scale at the cathode level because of cathode non-uniformities and the CNT emitter screening effect. Cathode non-uniformity can be caused by CNT material non-uniformity, composite mixture non-uniformity, cathode deposition non-uniformity, and cathode post processing (sintering and activation) non-uniformity, etc. These non-uniformities cause the electron emission to concentrate on a limited number of emission hot spots, significantly reducing the overall current density of the cathode when the total emission current is normalized by the cathode emission area. The emitter screening effect reduces the electric field enhancement of CNT emitters, and also significantly reduces the emission current from CNT cathodes. Presently, state-of-art CNT cathodes can operate stably at a current density up to 100 mA/cm$^2$. This is not enough for key high-end field emission MBX tube applications nor most microwave applications. One example is full body medical CT scanners, where 0.5 up to 1 A/cm$^2$ is required. Many TWT applications also require over 1 A/cm$^2$.

Thus, there is a need for high current field emission cathodes, and methods to make the same, to address the above mentioned challenges, and others, associated with conventional fabrication techniques.

SUMMARY

The present invention describes processes and methods for producing high current field emission cathodes including nanomaterials. It provides a path forward for the successful development of numerous novel vacuum electronic devices, including field emission-based flat panel displays, MBX, and microwave tubes, etc.

The present disclosure provides a process for producing high current field emission cathodes based on nanomaterials with a specific multi-layer structure. The multi-layer structure improves emission uniformity and emission stability of the nanomaterials-based field emission cathodes. The present disclosure also discloses processes for patterning field emission cathodes based on nanomaterials to alleviate the electric field screening effect on nano-emitters.

According to one embodiment, a method comprises forming a uniform composite mixture of a nonconductive matrix material and a conductive filler material, depositing the composite mixture uniformly on a cathode substrate, and subjecting the deposition to a number of heating cycles to form an adherent, electrically resistive layer on the cathode substrate; forming a uniform composite mixture of adhesion promoting materials, depositing the composite mixture uniformly on top of the electrically resistive layer, and subjecting the deposition to a number of heating cycles to form an adherent, adhesion promoting layer on the cathode substrate; and forming a uniform composite mixture including electron emitting nanomaterials, depositing the composite mixture uniformly on top of the adhesion promoting layer on the cathode substrate, and subjecting the deposition to a number of heating cycles to form an electrically resistive layer backed (with an electrically resistive layer as an under layer), adherent, nanomaterial-based electron emissive layer on the cathode substrate.

The electrically resistive layer adds a ballistic resistor to each individual nano-emitter, which suppresses emission hot spots and improves overall emission uniformity. It also limits the amount of current that passes through each individual nano-emitter, which protects the individual nano-emitters from over-current damage and improves the lifetime of the overall cathode. The adhesive promotion layer improves the adhesion of nano-emitters to the electrically resistive layer, which also serves to improve the stability and lifetime of the nanomaterials-based cathode.

According to yet another embodiment, the present disclosure also provides a method for producing high current field emission cathodes based on nanomaterials with a patterned structure. This method comprises forming a uniform composite mixture of a nonconductive matrix material and a conductive filler material, depositing the composite mixture uniformly on a cathode substrate to form a patterned deposition, where the patterned deposition includes islands of deposited composite mixture with well-defined gaps between the islands, subjecting the deposition to a number of heating cycles to form an adherent, and patterned electrically resistive island layer on the cathode substrate; forming a uniform composite mixture of adhesion promoting materials, depositing the composite mixture uniformly only on top of the islands on the cathode substrates, subjecting the deposition to a number of heating cycles to form adherent islands of adhesion promoting layer on the cathode substrate; and forming a uniform composite mixture of electron emitting nanomaterials, depositing the composite mixture uniformly only on top of the islands on the cathode substrate, and subjecting the deposition to a number of heating cycles to form electrically resistive layer-backed, and adherent islands with a nanomaterials-based electron emissive layer on the cathode substrate. Each set of heating cycles, in various embodiments, comprises three successively hotter firings.

This patterned cathode design can effectively reduce the electrical field screening effect between nano-emitters and serves to improve the overall emission current density of the nanomaterials-based field emission cathodes.

DETAILED DESCRIPTION

Exemplary processes that are consistent with the principles of the present disclosure, and corresponding structures and devices, are described as follows. In general, methods of the present disclosure can include a combination of some or all of the following steps, (1) forming a uniform composite mixture of nonconductive matrix materials and conductive filler materials, (2) depositing the composite mixture uniformly on a cathode substrate, (3) heating the composite deposition to form an adherent, electrically resistive layer on the cathode substrate, (4) forming a uniform composite mixture of adhesion promoting materials, (5) depositing the composite mixture uniformly on top of the electrically resistive layer, (6) heating the composite deposition to form an adherent, adhesion promoting layer on the cathode substrate, (7) forming a uniform composite mixture of electron emitting nanomaterials, (8) depositing the composite mixture uniformly on top of the adhesion promoting layer, and (9) heating the composite deposition to form an adherent, electrically resistive layer backed, nanomaterial-based field emissive layer on the cathode substrate. In some embodiments, rather than forming a continuous deposition, a patterned deposition is formed with individual electron emissive islands and well-defined gaps between them is preferred in the above deposition process to achieve a high emission current from the produced field emission cathodes.

Figure 1:
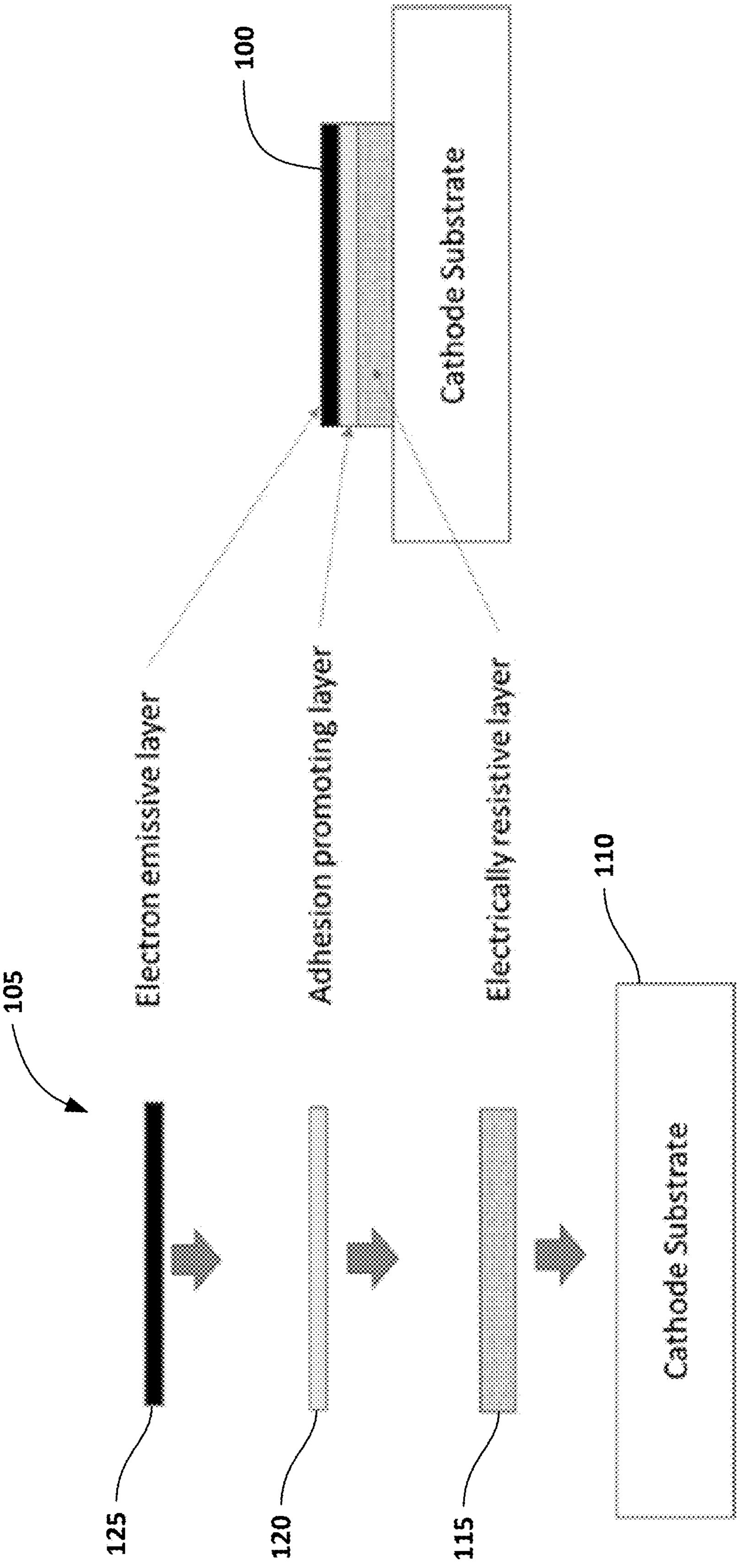
FIG. 1 is a schematic illustration showing the structure of a high current field emission cathode that is based on nanomaterials according to an exemplary embodiment.

FIG. 1 illustrates the structure of an exemplary high current field emission cathode 100 and the basic steps of a method 105 of forming the same. The high current field emission cathode 100 comprises a cathode substrate 110, an electrically resistive layer 115 disposed on the cathode substrate 110, an adhesion promoting layer 120 disposed on the electrically resistive layer 115, and an electron emissive layer 125 disposed on the adhesion promoting layer 120.

The method 105 optionally begins with a step of depositing the electrically resistive layer 115 on the cathode substrate 110. Depositing the electrically resistive layer 115 begins by forming a uniform composite mixture of one or more nonconductive matrix materials and one or more conductive filler materials from pre-formed raw material or raw material mixture. The nonconductive matrix materials can include, for instance, glass powders (e.g., sealing glass powders) containing various oxides, such as silicon oxide ($SiO_2$), aluminum oxide ($Al_2O_3$), calcium oxide (CaO), barium oxide (BaO), boron oxide ($B_2O_3$), zirconium oxide ($ZrO_2$), magnesium oxide (MgO), sodium oxide ($Na_2O$), potassium oxide ($K_2O$), iron oxide ($Fe_2O_3$), lead oxide (PbO), nickel oxide (NiO), tin oxide ($SnO_2$), etc. The nonconductive matrix materials can also be a mixture of glass powders containing various fluorides, such as zirconium fluoride ($ZrF_4$), aluminum fluoride ($AlF_2$), and beryllium fluoride ($BeF_2$), etc. The nonconductive matrix materials can also include glass powders containing various chlorides such as calcium chloride ($CaCl_2$)), in some embodiments. The nonconductive matrix materials can also be any mixture of oxides, fluorides, and chlorides. Preferably, the nonconductive matrix materials are characterized by high melting temperatures (>400° C.) and low vapor pressures (<$1\times10^{-6}$ torr at 600° C.).

The conductive filler materials can be various conductive materials, including CNTs, conductive nanowires (copper (Cu) nanowires, silver (Ag) nanowires, cerium hexaboride ($CeB_6$) nanowires, and lanthanum hexaboride ($LaB_6$) nanowires, etc.), conductive carbon black, metal powders such as silver (Ag), copper (Cu), iron (Fe), Cobalt (Co), Nickel (Ni), molybdenum (Mo), and tungsten (W), and oxide powders including, for example, indium oxide ($In_2O_3$), zinc oxide (ZnO), tin oxide ($SnO_2$), gallium oxide ($Ga_2O_3$), cadmium oxide (CdO), and indium tin oxide (ITO)), or any mixture of these. Preferably, the conductive filler materials are also characterized by high melting temperatures (>800° C.) and low vapor pressures (<$1\times10^{-6}$ torr at 600° C.). The conductive filler materials in the electrically resistive layer 115 can either comprise nanomaterials or not.

The cathode substrate 110 should be high vacuum compatible material with a high melting temperature and a low vapor pressure. It can comprise a metal, such as Cu, 304 stainless steel, Mo, etc., and alloys thereof. Substrates 110 can also be made from metalized nonconductive materials, including Ag, Cu, Ni, or Mo metalized silicon (Si), silicon nitride, quartz, sodium lime glass, or alumina ($Al_2O_3$, such as with 90% or better purity).

The composite mixture of adhesion promoting materials can comprise, in some embodiments, a large concentration of a glass powder and a small amount of nanomaterials, where the glass powder comprises a mix of compounds. The glass powder can either be the same glass powder of nonconductive matrix materials used to form the electrically resistive layer 115, or can be a glass powder with a different composition. The glass powder used here is selected from the same oxides, fluorides, chlorides, and their mixtures, as listed previously.

The composite mixture of electron emitting nanomaterials consists of a large concentration of electron emissive nanomaterials and a small amount of a glass powder. The glass powder here can either be the same as either glass powder used in the prior layers or can be of a different composition, and is selected from the same oxides, fluorides, and chlorides listed previously.

Figure 2A:
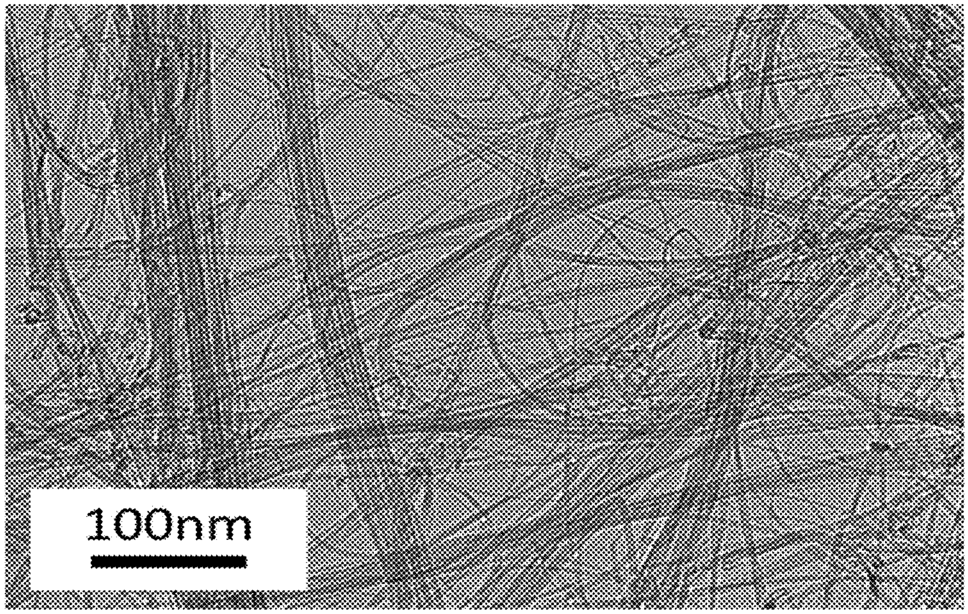
FIG. 2A is a transmission electron microscopy (TEM) micrograph of high purity small diameter multiwalled carbon nanotubes (SDMWNTs) produced by a chemical vapor deposition (CVD) technique.
Figure 2B:
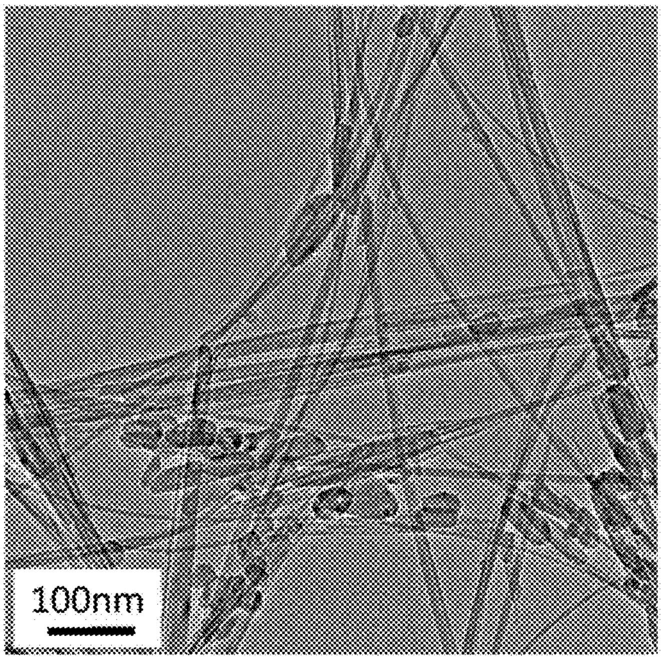
FIG. 2B is a TEM micrograph of high purity multiwalled carbon nanotubes (MWNTs) produced by an arc discharge (AD) technique.

The nanomaterials used herein optionally can comprise single-walled carbon nanotubes (SWNTs) with diameters between 1 and 2 nm, small diameter multiwalled carbon nanotubes (SDMWNTs) with diameters between 2 to 5 nm. FIG. 2A is a TEM micrograph of exemplary SDMWNTs. Nanomaterials used herein can also comprise multiwalled carbon nanotubes (MWNTs) with diameters between 10 to 20 nm. FIG. 2B is a TEM micrograph of exemplary MWNTs. In various embodiments the length of the above mentioned CNTs should be >1 micrometer (μm), and preferably between about 2 to 5 μm. Additionally, the above mentioned CNTs, in some embodiments, have a high carbon purity (>80% carbon purity).

The above-mentioned CNT raw materials can be fabricated according to a number of different techniques known in the art, including laser ablation (LA) techniques, chemical vapor deposition (CVD) techniques, and arc discharge (AD) techniques. After fabrication, the raw CNTs are subjected to a purification process. A number of techniques for purifying raw CNTs can be used to produce high purity CNTs, including an acid wash such as with hydrochloride acid (HCl), sulfuric acid ($H_2SO_4$), or nitric acid ($HNO_3$), or a hydrogen peroxide ($H_2O_2$) reflux, or an air oxidation followed by an acid wash.

Besides pristine CNTs, the nanomaterials used above can also comprise doped CNTs including nitrogen (N), boron (B), or sulfur(S), for example, as a dopant. N doped CNTs have a reduced work function, which can contribute to an enhanced emission current. Doped CNTs can be produced by in situ doping, e.g., introducing doping agents when the CNTs are synthesized. Alternatively, doped CNTs can be produced by a substitutional doping reaction between dopants and pristine CNTs.

The nanomaterials used above can also comprise materials other than CNTs including nanotubes that are not principally made of carbon, and nanowires. $CeB_6$ and $LaB_6$ nanowires are two good examples due to their exceptionally low work functions (2.5 eV and 2.7 eV respectively). LA, CVD, and AD techniques can also be used to produce $CeB_6$ and $LaB_6$ nanowires. The as-grown, raw nanowires can also be purified by an acid wash with the acids noted above, followed by sonication, and a filtration process. For field emission applications, the diameter of the $CeB_6$ and $LaB_6$ nanowires should be less than about 20 nm, and preferably, less than about 10 nm. For these applications, the lengths of $CeB_6$ and $LaB_6$ nanowires should be greater about 1 μm, and preferably from about 2 to 5 μm.

Compared with pristine CNTs, doped CNTs and other nanowires often have more structural defects and less structural integrity which can degrade the field emission properties of these materials. In some embodiments a high temperature annealing process is used to remove structural defects and improve structural integrity. According to one embodiment, the purified nanowires or doped CNTs are annealed in a controlled environment, for instance, in an inert gas environment such as argon (Ar), nitrogen ($N_2$), mixtures thereof, or a high vacuum (e.g., $2\times10^{-4}$ torr or better), at high temperature for an extended period of time to improve their structural integrity. The annealing temperature of a nanomaterial, in some embodiments, should be between about 50% to 90%, and preferably about 80% of the melting temperature of that material. For example, about 2000° C. is an appropriate annealing temperature for $CeB_6$ nanowires and about 1800° C. is an appropriate annealing temperature for $LaB_6$ nanowires. Since the melting temperature for carbon materials is extremely high (>3000° C.), doped CNTs can be annealed at temperature of at least about 2000° C., and preferably about 3000° C. The annealing time should be as long as possible, and at least 3 hours, to achieve the optimal results.

Figure 3A:
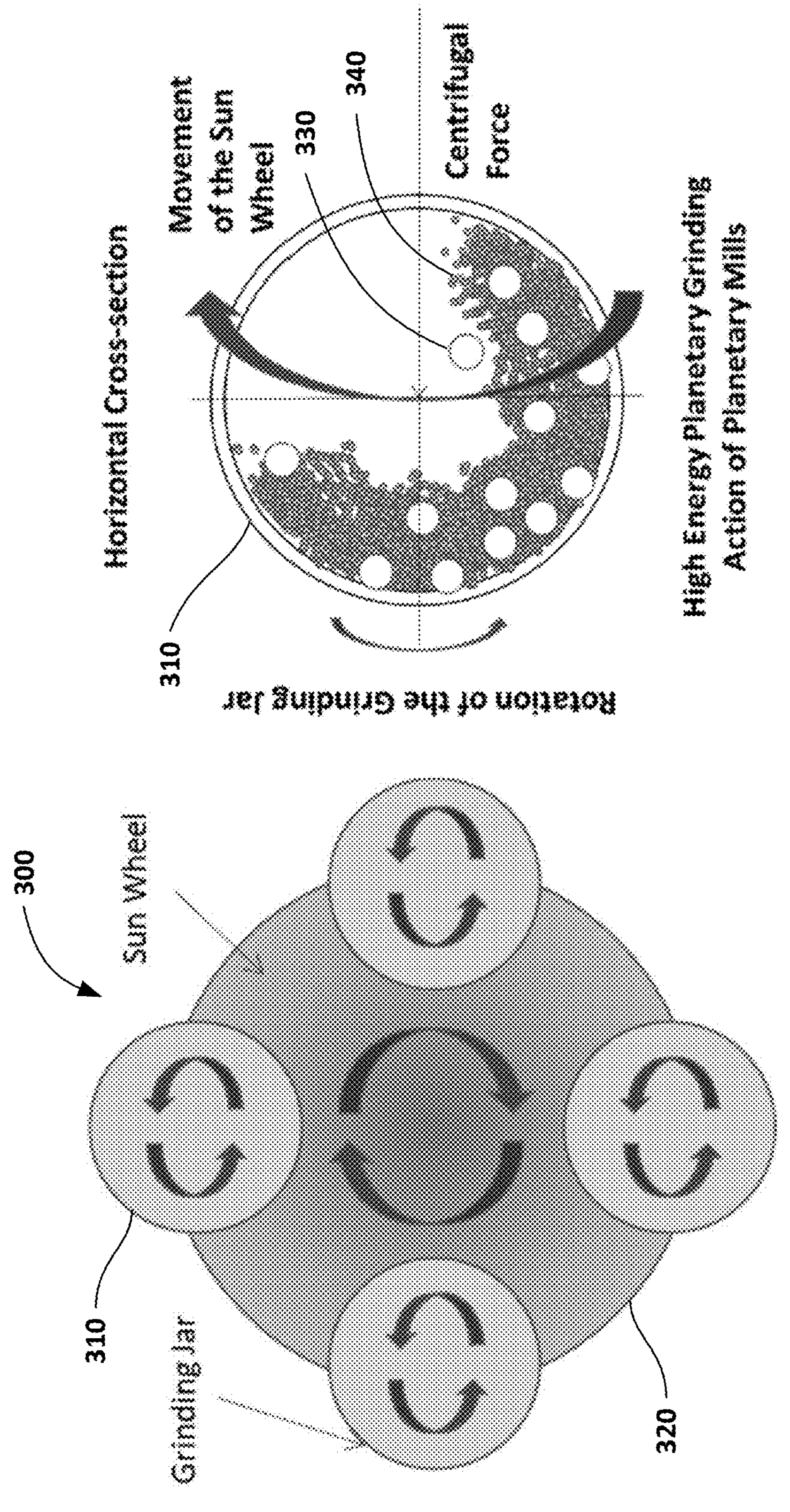
FIG. 3A is a schematic illustration showing the working mechanism of a planetary, rotary ball milling machine.
Figure 3B:
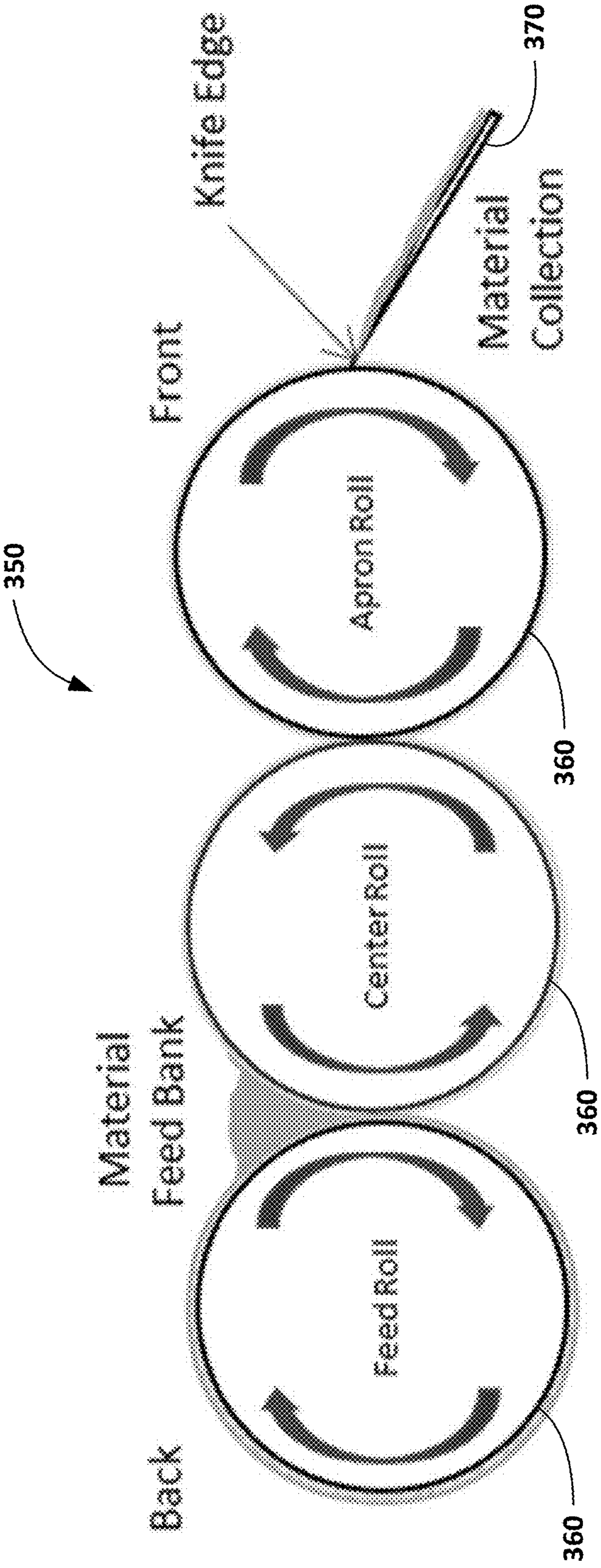
FIG. 3B is a schematic illustration showing the working mechanism of a 3-roll milling machine.
Figure 4:
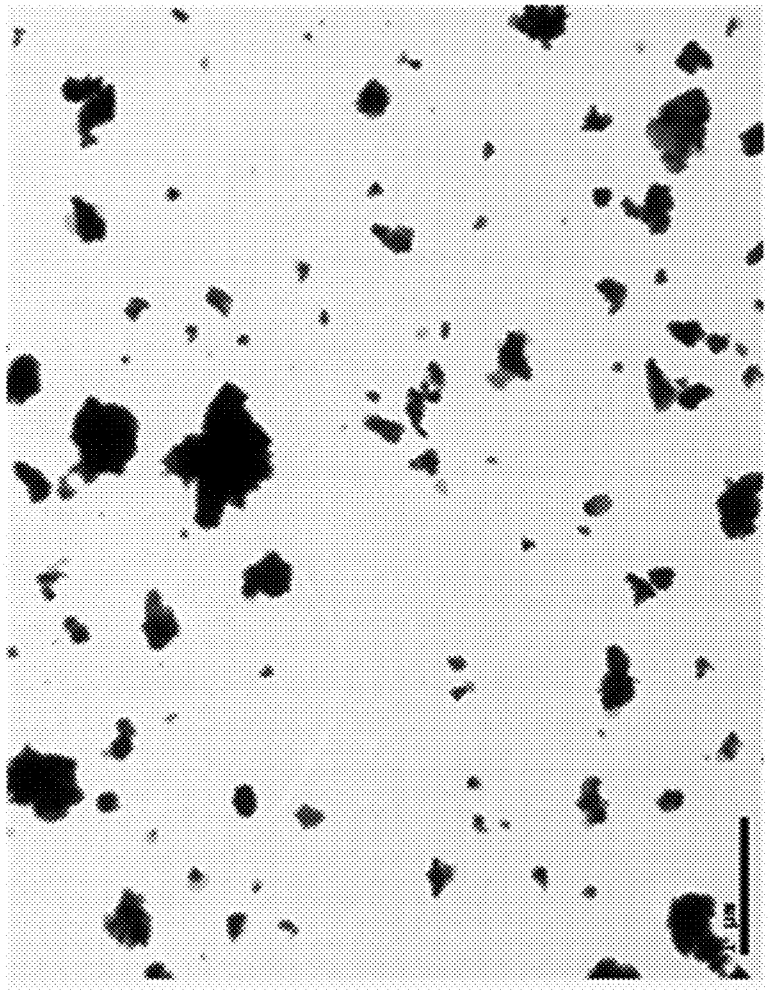
FIG. 4 is a TEM micrograph of a submicron glass powder after being processed by a high-power ball mill.

To form uniform composite mixtures in the steps above, glass powders, metal particles, and other conducting oxide particles with small particle sizes should be used. Ideally, materials with submicron particle sizes should be used. Various mechanical milling processes can be used to process solid materials to reduce their particle sizes, including high shear milling techniques such as planetary, rotary ball milling, 3 roll milling, and impact ball milling techniques. FIGS. 3A and 3B illustrate planetary, rotary ball milling and 3 roll milling processes, respectively. In FIG. 3A, a planetary, rotary ball mill 300 comprises four grinding jars 310 that are rotatably disposed around a rotatable sun wheel 320. Each grinding jar 310 is loaded with grinding balls 330 and material to be ground 340. In FIG. 3B, a 3 roll mill 350 comprises three grinding rolls 360 arranged in series, with adjustable spaces in between to set a desired particle size. Material to be ground is firstly mixed with a solvent to form a viscous slurry or paste. The slurry or paste is then fed between first and second of the rolls 360 separated by a first gap, and resulting particles are ground a second time between the second and third rolls 360, having a smaller gap therebetween, and removed from the third roll 360 by a knife edge 370 set against the third roll 360. According to one embodiment of the present disclosure, a Micron-sized glass powder is mixed with an organic solvent (e.g., isopropyl alcohol, ethyl alcohol, etc.) and processed by a planetary, rotary ball mill 300 at high power. The particle size of the glass powder can be reduced to a submicron size (~100 nm) after processing. FIG. 5 is a TEM micrograph of a representative sample following milling. In another embodiment, a Micron-sized glass powder is mixed with an organic solvent (such as butyl carbitol acetate, terpineol, etc.) and processed by a 3-roll mill 350 at a high shearing force. The particle size of the glass powder is reduced to a submicron size (~100 nm) after processing.

To form a uniform composite mixture in the steps above, mixture components (e.g., glass powders, metal particles, conducting oxide particles, CNTs, doped CNTs, $CeB_6$ nanowires, and $LaB_6$ nanowires, etc. must be mixed thoroughly. Again, high shear milling techniques (such as planetary, rotary ball milling, and 3-roll milling) can be used to achieve this goal. According to one embodiment, sub micron-sized glass powders are mixed with CNTs and an organic solvent and processed by a planetary, rotary ball mill 300 at high power (such as up to 500 RPM for at least 30 minutes) to achieve a highly uniform mixture with well dispersed CNTs. In another embodiment, sub micron-sized glass powders mixed with CNTs and an organic solvent are processed by a 3-roll mill 350 at a high shearing force of at least 5 N/mm and preferably 10 N/mm or more, to achieve a highly uniform mixture with well dispersed CNTs. CNTs and nanowires tend to aggregate together due to van der Waals force and are very difficult to disperse. High shear force is often required to break down CNT or nanowire agglomerations and disperse them. In some embodiments, repeated processing at a high shear force is used to process CNTs or nanowire mixtures to achieve uniform mixtures with well dispersed CNTs, and/or nanowires.

The deposition of composite mixtures onto the cathode substrates as described above can be performed using different deposition techniques, including electrophoretic deposition (EPD), screen printing (SP), stencil printing, spray coating, doctor blade coating, and slot die coating, etc.

Figure 5A:
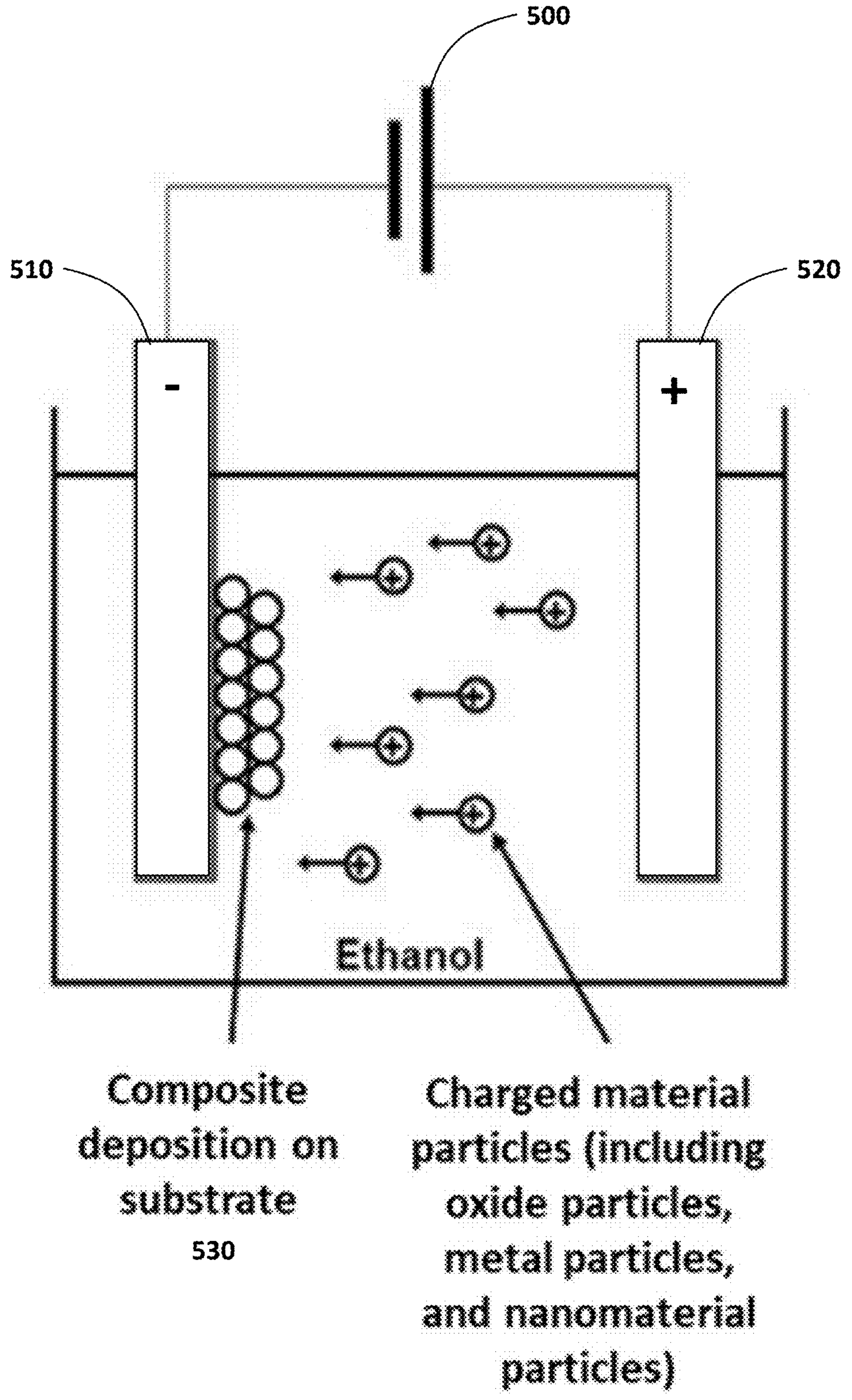
FIG. 5A is a schematic illustration showing the working mechanism of electrophoretic deposition (EPD) process.

FIG. 5A serves to illustrate the EPD process, which can be divided into two steps. The first step is to prepare a deposition bath. Each deposition layer typically employs one bath. The high current field emission cathode 100 disclosed herein consists of three layers, and in some embodiments 3 different deposition baths are used. To prepare an EPD bath, ingredients (e.g., glass powders, metal particles, conducting oxide particles, CNTs, doped CNTs, $CeB_6$ nanowires, and $LaB_6$ nanowires, etc.) are added to an organic solvent or solvent mixture according to a predetermined weight or volume ratio. A small amount of deionized water (<1% by volume) and a charger (e.g., magnesium chloride ($MgCl_2$), or aluminum chloride ($AlCl_3$), etc.) at a concentration of less than 30 ppm are added to the EPD bath. An additional polymeric binder and a dispersion agent (polyvinylpyrrolidone (PVP) with average molecular weight >40,000 g/mol, or polyvinylidene fluoride (PVDF) with average molecular weight >500,000 g/mol) can also be added to the EPD bath to improve the dispersion uniformity of the nanomaterials and the stability of the bath. To achieve a uniform and stable dispersion, materials with a small particle size (sub-micron) should be used. The EPD bath (especially a bath with nanomaterials) should also be processed by a high power high shear mixer (e.g., 500 RPM for at least 30 minutes), or a sonication horn or bath (500 W for at least 3 hours). After preparation, the charger ionizes in the bath, and the material particles become positively charged by absorbing the positively charged metal ions ($Mg^{2+}$, or $Al^{3+}$).

The second step is a deposition process, e.g., electrophoresis. In such a method, as shown in FIG. 5A, a DC voltage is applied by a DC power supply 500 between two electrodes 510, 520 in the deposition bath, where the cathode electrode 510 is the substrate 110 and a metal counter electrode 520, for example a stainless steel plate, is the anode electrode. The two electrodes 510, 520 are placed in parallel facing each other. The positively charged material particles, including glass powders, metal particles, conducting oxide particles, CNTs, doped CNTs, $CeB_6$ nanowires, and $LaB_6$ nanowires, etc., are driven toward the substrate 510 and deposit thereon. According to one embodiment, sub micron-sized glass powders and ITO particles with a weight ratio of 10 to 1 are suspended in ethyl alcohol that has been charged by $MgCl_2$. The substrate 510 is masked by a shadow mask for a 1 cm diameter deposition area and the distance between the surface of the substrate 510 and the counter electrode 520 is kept at ~2.5 cm. After electrophoresis at 400V DC for 1 minute, a 25 μm thick electrically resistive layer 530 can be deposited on the cathode substrate 510.

Figure 5B:
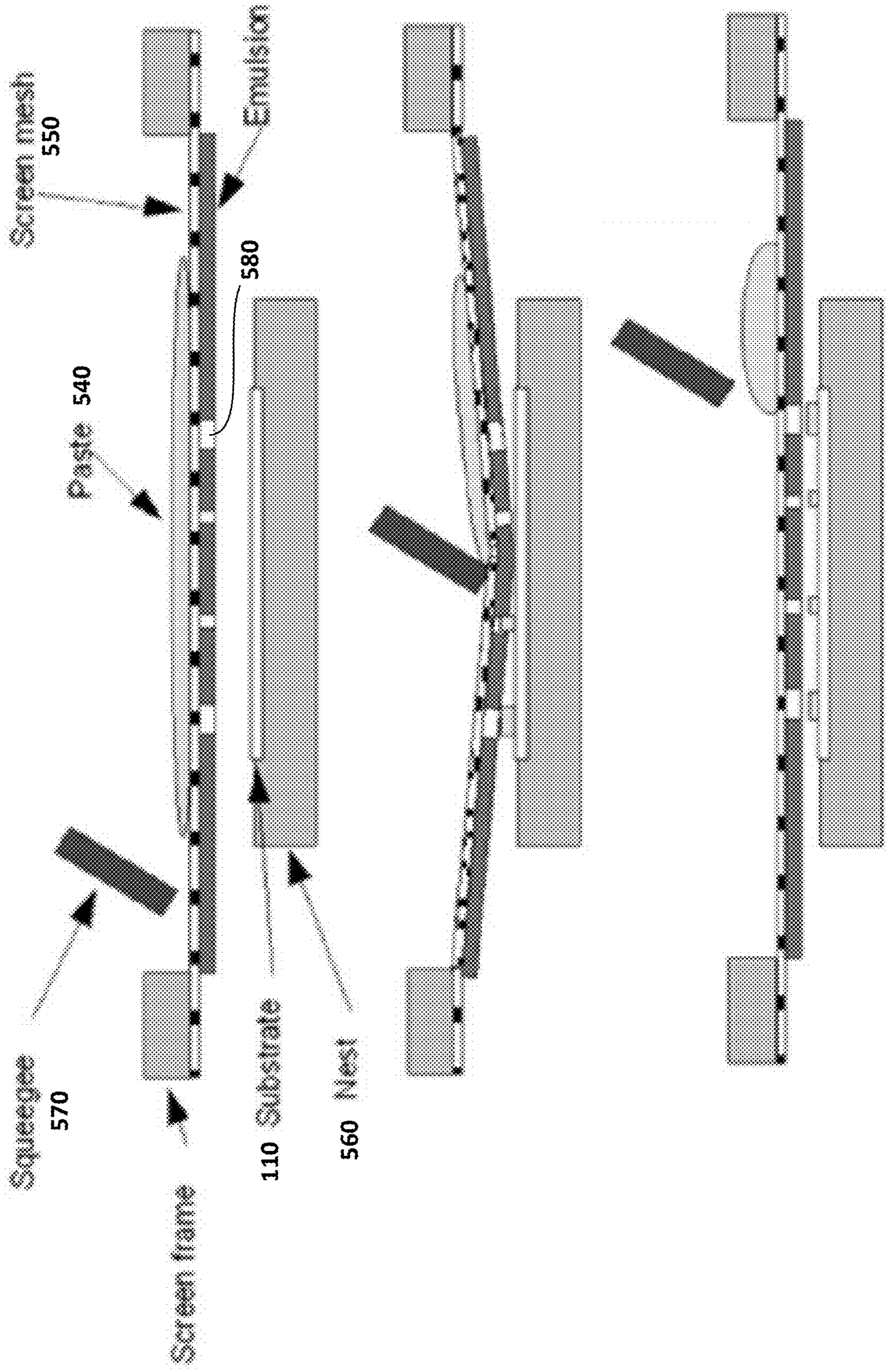
FIG. 5B is a schematic illustration showing the working mechanism of screen printing (SP) process.

The SP process, shown in FIG. 5B, also comprises two steps. The first step is to prepare a deposition slurry or paste. Each deposition layer typically employs one paste. The high current field emission cathode 100 disclosed herein consists of three layers and in some embodiments three different deposition pastes are prepared. To prepare a deposition paste, the ingredients (glass powders, metal particles, conducting oxide particles, CNTs, doped CNTs, $CeB_6$ nanowires, and $LaB_6$ nanowires, etc.) are added to an organic solvent (e.g., ethyl alcohol, isopropyl alcohol, butyl carbitol acetate, N-methyl-2-pyrrolidone (NMP), dimethylformamide (DMF), 1,2-dichrolobenzene, and terpineol, etc.) or a solvent mixture according to a predetermined weight or volume ratio. An additional polymeric binder and a dispersion agent (such as PVP with an average molecular weight >40,000 g/mol, PVDF with average molecular weight >500,000 g/mol, ethyl cellulose, and poly (methyl methacrylate-co-hydroxyethyl methacrylate) (PMMA-co-PHEMA) copolymers, etc.) can be added to the deposition paste to improve nanomaterial dispersion uniformity, stability, and printability. To achieve a uniform, well dispersed, and stable deposition paste, the deposition paste (especially deposition pastes containing nanomaterials) can be processed using a high power, high shearing force mixer (such as a planetary, rotary ball mill 300, or a 3-roll mill 350). After the deposition paste is prepared, a certain amount of the paste 540 can be spread across a printing screen 550 positioned above a cathode substrate 110 that is supported by a nest 560. The emulsion defines printing or deposition pattern by blocking most mesh apertures of printing screen 550 and making them impermeable to the paste 540. A blade or squeegee 570 is moved across the screen 550 to fill the open mesh apertures 580 with paste 540, and a reverse stroke then causes the screen 550 to touch the substrate 110 momentarily along a line of contact. This causes the paste 540 to wet the substrate 110 and be pulled out of the mesh apertures 580 as the screen 550 springs back after the blade 570 has passed. According to one embodiment, a sub micron-sized glass powder and ITO particles with a weight ratio of 10 to 1 are suspended in ethyl alcohol. After screen printing, about an 8 μm thick electrically resistive layer is deposited on the cathode substrate. The suitable thickness of the electrically resistive layer is less than 30 μm, and preferably around 10 μm.

The heating process following each of the composite depositions described above can include three firing cycles, in some embodiments. The first firing cycle is in air at a temperature from 80° C. to about 150° C. for up to about 30 minutes. The first firing cycle removes the organic solvent trapped in the composite deposition. The second firing cycle can be performed in an inert gas (e.g., Ar, $N_2$, or mixtures thereof) at a temperature up to about 500° C. for 30 minutes. This step will burn out any polymeric binder or dispersant in the composite deposition. The last firing cycle is in a high vacuum (1×10−5 torr or better) with a temperature up to about 1500° C. for up to 3 hours. The third firing cycle serves to activate the glass powders in the composite deposition and produce a fully solidified, and adherent composite layer on the cathode substrate 110. In various embodiments, rather than performing three firings after each deposition it is also possible to perform all three firings after the final deposition, or to perform the first two firings after the first two depositions and then all three firings after the third deposition. Other combinations can also be used.

The high current field emission cathodes 100 disclosed herein have a unique multi-layer structure. The electrically resistive layer 115 contains a mixture of a nonconductive material and a conductive material. The weight ratio of the nonconductive material to the conductive material is preferably in the range from about 1000:1 to about 1:1. More preferably, this ratio should be in the range from about 100:1 to about 5:1. The thickness of the electrically resistive layer 115 should be less than about 30 μm and preferably less than about 10 μm. The adhesion promoting layer 120 contains a large amount of a nonconductive material and a small amount of nanomaterials. The weight ratio of the nonconductive material to the nanomaterial in adhesion promoting layer 120 is preferably in the range from about 100:1 to about 2:1. More preferably, this ratio should be in the range from about 10:1 to about 5:1. The thickness of the adhesion promoting layer 120 should be less than about 10 μm and preferably less than about 5 μm. The electron emissive layer 125 contains a large amount of nanomaterials and a small amount of nonconductive material. The weight ratio of the nonconductive material to the nanomaterial is preferably in the range from about 1:1000 to about 1:1, and more preferably in the range from about 1:200 to about 1:20. The thickness of the electron emissive layer 125 should be less than about 10 μm and preferably less than about 5 μm.

Figure 6:
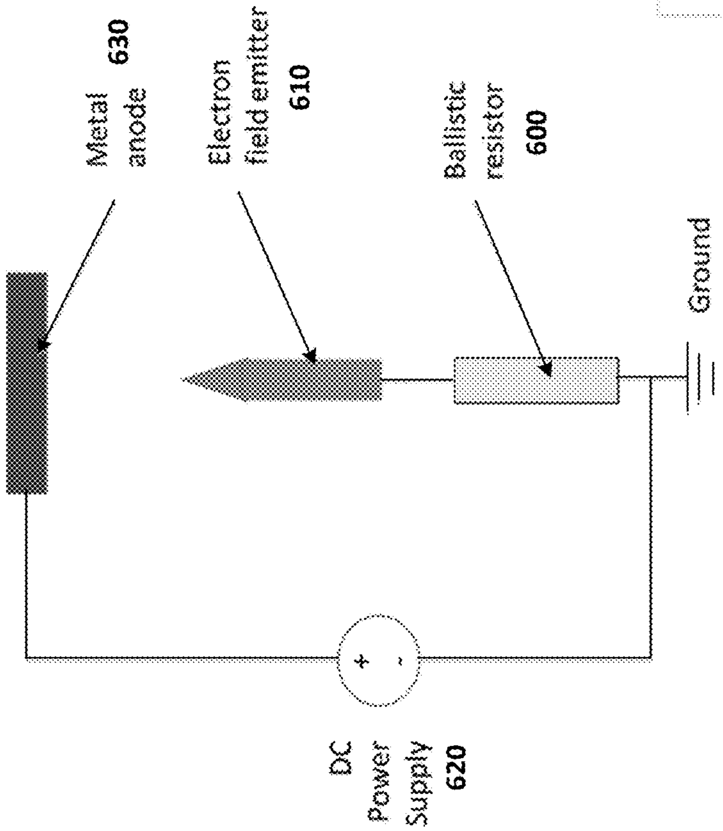
FIG. 6 is a schematic illustration showing the negative feedback working mechanism of a ballistic resistor.

The electrically resistive layer 115 adds a ballistic resistor to each individual nano-emitter, which suppresses emission hot spots and improves the overall emission uniformity. It also limits the current that passes through each individual nano-emitter, which protects the individual nano-emitters from over-current damage and improves the lifetime of the overall cathode 100. This mechanism can be illustrated by the schematic in FIG. 6. In FIG. 6, a ballistic resistor 600 is sequentially connected to an electron field emitter 610. A constant positive voltage is applied by a DC power supply 620 between the anode 630 and the resistor 600 plus emitter 610, to draw electrons from the emitter 610. When the emission current from the emitter 610 increases, the voltage drop on the ballistic resistor 600 also increases. Since the total voltage applied in the circuit is constant, the voltage increase on the ballistic resistor 600 results in a voltage drop between the anode 630 and the emitter 610, which in turn reduces the emission current and helps to keep the emission current stable. When the emission current from the emitter 610 decreases, the ballistic resistor 600 operates the other way around. In both cases, the ballistic resistor 600 provides a negative feedback that helps keep the emission current from the emitter 610 stable. For this mechanism to work, the sheet resistance of the electrically resistive layer 115 as described above should be in a range from about 10 Ω/square to about 1000 Ω/square, and preferably around 100 Ω/square.

Figure 7:
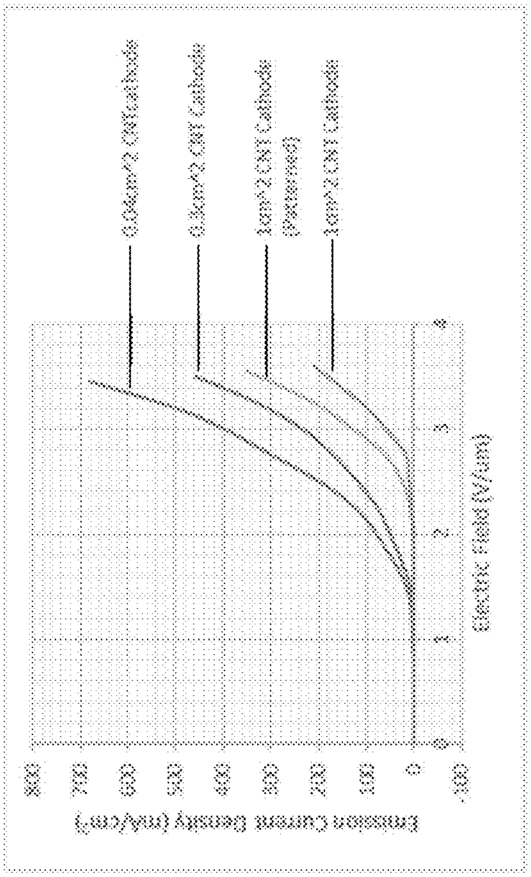
FIG. 7 illustrates emission current density versus electric field curves of CNT field emission cathodes with different emission areas as well as for patterned CNT cathodes according to an exemplary embodiment.

Patterning the high current field emission cathode 100 is a further way to improve the emission current thereof. The emission current density of a CNT field emission cathode is reduced when the emission area of the cathode increases, as shown in the graph of FIG. 7. This phenomenon may be caused by the electric field screening effect. Breaking a large emission area into smaller islands with well-defined gaps between them can effectively alleviate the screening effect and improve the emission current of large field emission cathodes, as also shown in FIG. 7. The island area on a patterned field emission cathode 100, in some embodiments, should be no larger than 0.3 $cm^2$ and preferably not larger than 0.1 $cm^2$. The gap distance between islands should be at least 0.1 mm and preferably larger than 0.5 mm.

Figure 8A:
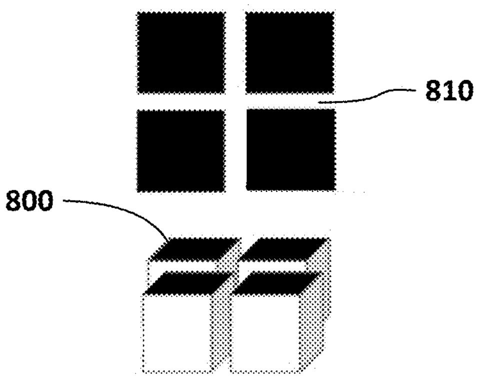
FIG. 8A shows top and perspective views of a patterned field emission cathode comprising four individual field emission cathodes with a small emission area according to an exemplary embodiment.
Figure 8B:
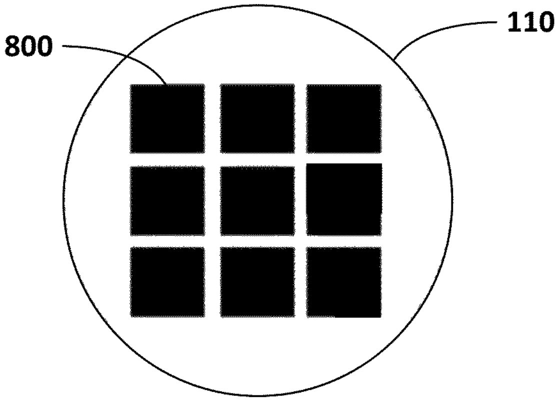
FIG. 8B shows a patterned field emission cathode with 9 square shaped electron emissive islands on a cathode substrate according to an exemplary embodiment.
Figure 8C:
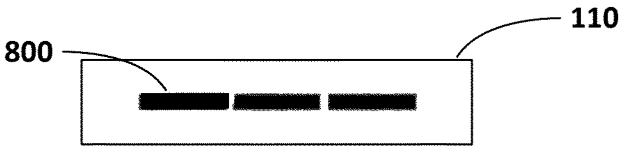
FIG. 8C shows a patterned field emission cathode with 3 rectangle shaped electron emissive islands on a cathode substrate according to an exemplary embodiment.

The patterned field emission cathodes can be produced using different approaches. According to one embodiment, shown in FIG. 8A, four CNT cathodes 800 with small emission areas are pre-produced. These cathodes are then aligned together to make up a large CNT cathode with a predetermined gap 810 distance between them. In FIG. 8A the perspective view shows the four CNT cathodes 800 prior to alignment, while the top view shows the CNT cathodes after being aligned. An exemplary distance between CNT cathodes 800 in the gaps 810 is about 1 mm. FIGS. 8B and 8C show two additional exemplary embodiments. FIG. 8B illustrates 9 CNT cathodes 800 patterned, through a masking process, in a square array of islands on a circular substrate 110. FIG. 8C shows a row of three rectangular island cathodes 800 on a rectangular substrate 110.

Figure 9:
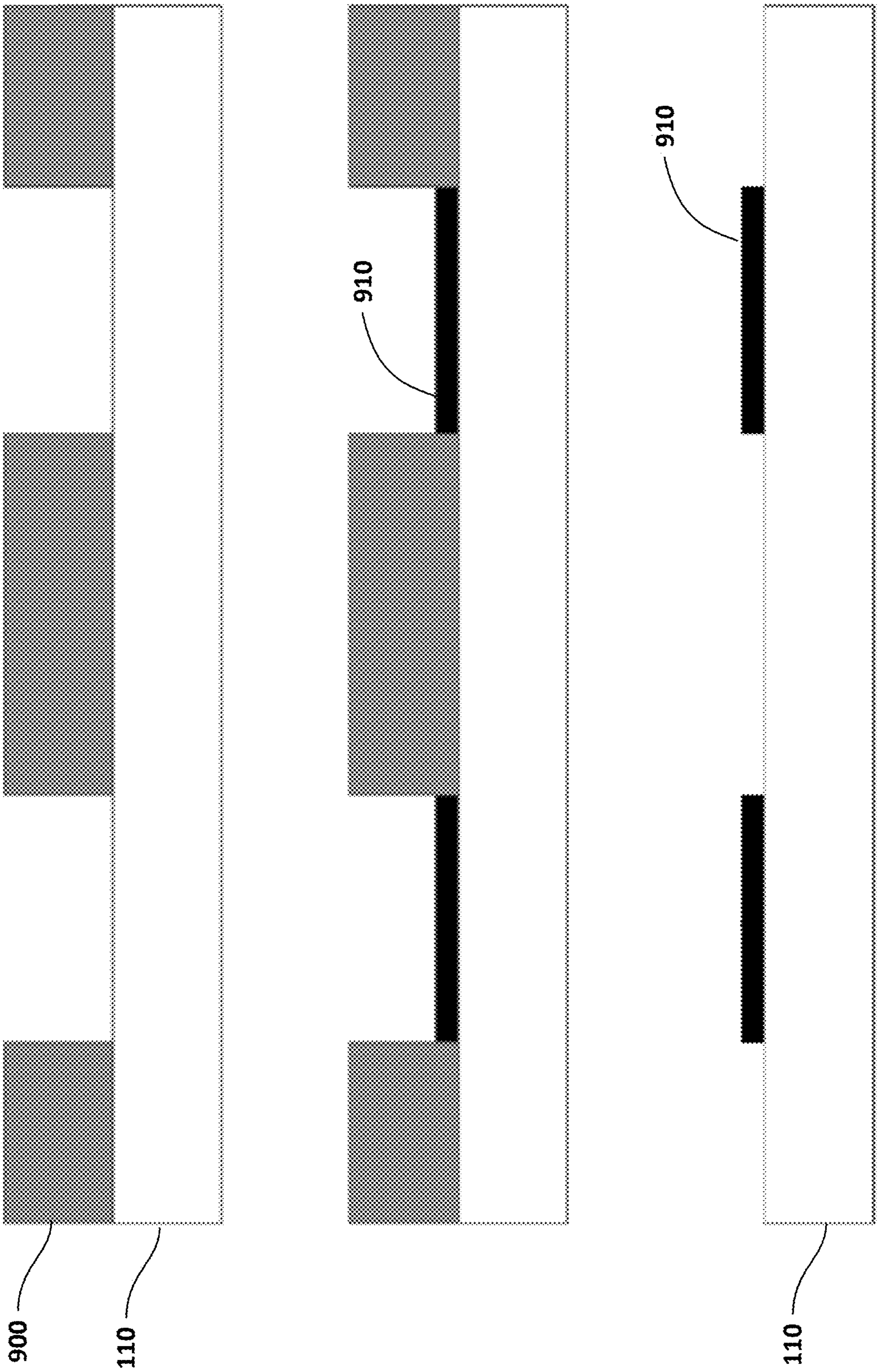
FIG. 9 is a schematic illustration showing a shadow masking scheme for producing patterned field emission cathodes according to an exemplary embodiment.

As noted, patterned field emission cathodes 100 can be made on a single cathode substrate 110. FIG. 9 shows an exemplary fabrication method using masking and an EPD process. In FIG. 9 a mask 900 is formed on the substrate 110, where the mask 900 can be either a thick shadow mask or a thin photo resist mask including a pattern defined therein. Since EPD must be done in a bath containing mostly organic solvent, the mask 900, in these embodiments, needs to be a shadow mask or photoresist that is resistant to the selected organic solvent, such as nylon based shadow mask, or epoxy-based negative photoresist SU-8. A photoresist mask 900 can be formed by depositing a layer of a photoresist across the entire substrate 110, such as with a spin-on photoresist, then placing a photo mask on top of the photoresist layer, then exposing the assembly to UV light to expose the photoresist through the openings in the photo mask. The UV exposure changes the photoresist chemically so that where the photoresist has been exposed it can be readily removed, leaving the photoresist mask 900. Once the mask 900 is formed, the substrate 110 is placed in a deposition bath as in FIG. 5 to deposit islands 910 within the areas where the substrate 110 is exposed to the deposition bath by the mask 900. The substrate 110 is then removed from the deposition bath and the mask 900 is stripped away, leaving just the islands 910 on the substrate 110. In the alternative, patterned field emission cathodes can be printed directly on large substrates by screen printing as shown in FIG. 5B using a pre-patterned printing screen or stencil mask.

Figure 10:
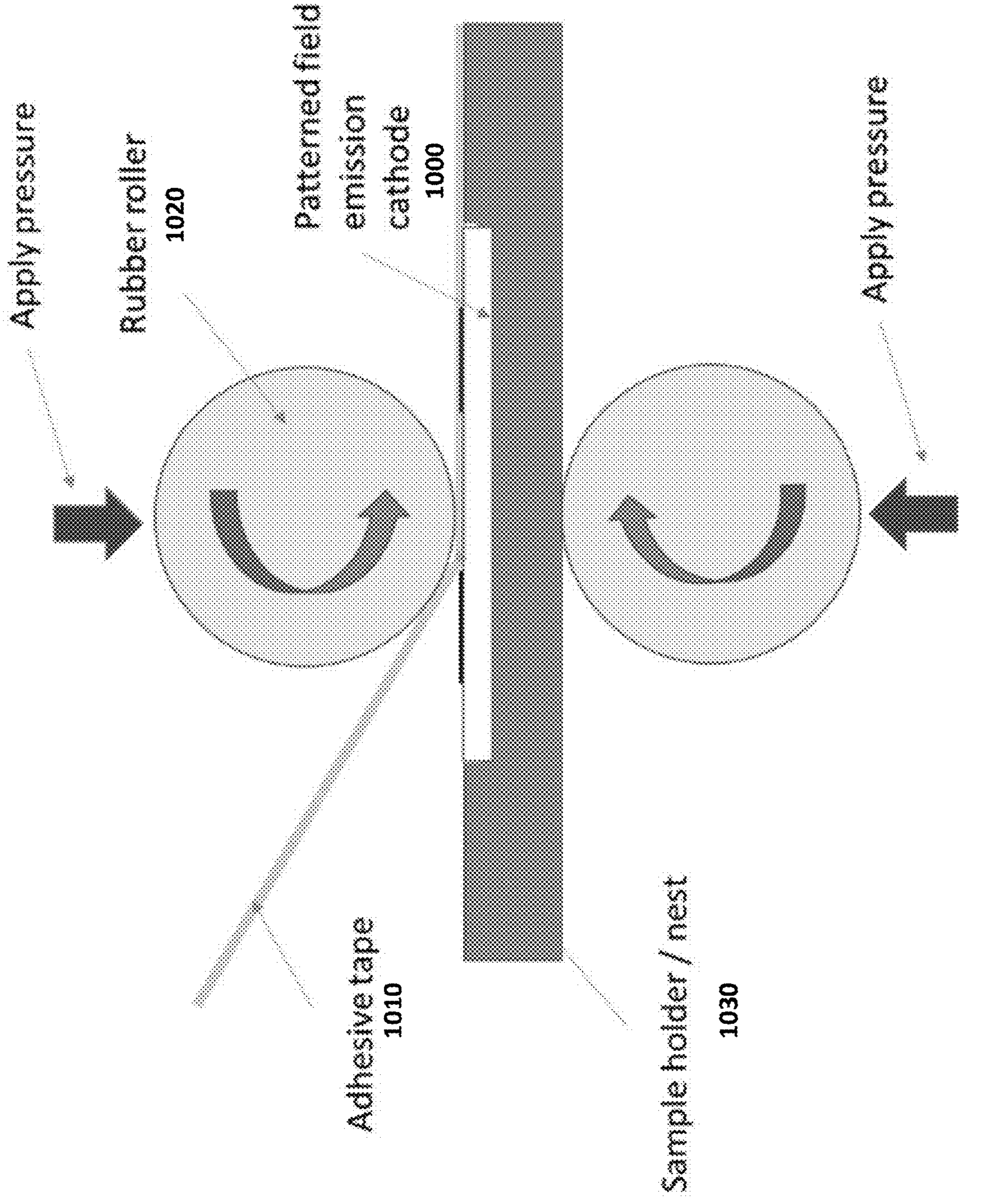
FIG. 10 is a schematic illustration showing a rubber roller system for applying adhesive tape to activate nanomaterials-based field emission cathodes according to an exemplary embodiment.

After production, nanomaterials-based field emission cathodes should be activated before use to achieve optimal performance. Taping the cathode emission surface using an adhesive tape is one effective activation approach, as illustrated by FIG. 10. A wide variety of adhesive tapes with different kinds of adhesives (e.g., acrylates, natural and synthetic rubbers including silicone, etc.) can be used for this task. UV- and thermo-curable adhesives (including, for example, various polymer based chemical systems, including acrylic, epoxy polybutadiene (EP), polyester, silicone, styrene copolymer, and vinyl, etc.) can also be used to activate nanomaterials-based field emission cathodes. In either case, high quality adhesives as described below can be used. Preferably, the adhesive tapes should have a very uniform adhesive coating that does not leave any adhesive residue on the cathodes after being removed. Also, for optimal activation results, an adhesive tape with a peeling strength between about 5N/100 mm to about 50N/100 mm should be used and preferably the peeling strength should be between about 20N/100 mm to about 30N/100 mm. Repeated taping (repeatedly applying an adhesive tape to a cathode emission surface and then peeling it off) is employed, in some embodiments, to achieve an optimal activation result. According to one embodiment, a CNT cathode 1000 is taped by an adhesive tape 1010 (such as a silicone adhesive with a polyester backing) for at least 3 times to achieve optimal field emission performance. Applying the adhesive tape 1010 uniformly without any air pockets and with a proper and uniform pressure and speed is important to achieve uniform emission. A laminating machine, illustrated by FIG. 10, can be used to automate the taping process. In some embodiments, the laminating machine applies the adhesive tape 1010 on a cathode surface using two rubber rollers 1020. The pressing force on the rollers 1020 per centimeter (cm) of roller length should be in range from about 0.02 kg/cm to about 0.3 kg/cm and preferably around 0.1 kg/cm to 0.15 kg/cm. The speed at which the sample is advanced between the rollers 1020, can be controlled by adjusting the rotating speed of the rollers 1020, and should be in the range from about 1 cm/minute to about 200 cm/minute and preferably between 20 cm/minute to 100 cm/minute.

Removing (peeling off) the adhesive tape 1010 at a constant force and uniform speed is also important to achieving optimal emission performance. Before peeling off the adhesive tape 1010, the field emission cathode 1000 should be secured on a base 1030. There should not be any movement of the cathode 1000 during the entire tape peeling process. Preferably, the adhesive tape 1010 should be peeled off from the cathode 1000 along a straight line on its surface. It should initiate from one edge of the cathode, proceed through the entire cathode surface, and complete when the cathode 1000 is completely separated from the adhesive tape 1010. The peeling force should be slightly larger than the peeling strength of the adhesive tape 1010 and the peeling force should be maintained uniformly along the peeling line. Additionally, the adhesive tape 1010 should be peeled off at an angle from the surface of the cathode 1010. The angle can be between 15° to 90°, preferably around 45° to achieve optimal activation results.

Subjecting the taped nanomaterial cathode 1000 to high voltage pulses for an extended period of time (up to 100 hours in some embodiments) can also improve the field emission performance of the cathode 1000. The voltage used for this purpose will depend on the distance between the nano-emitters and the electron extraction electrode. Generally speaking, an electric field of $<10V/\mu m$ is preferable, which corresponds to <3 kV for a 300 μm distance between the nano-emitters and the electron extraction electrode. The high voltage pulse is preferably a square wave, in some embodiments. The single pulse width should be <250 ms, and preferably between 100 us and 10 ms. The rest period between consecutive pulses should be at least 10 times longer than the voltage pulse width, preferably between about 100 times and about 1000 times the voltage pulse width. For example, the cathode 1000 can be run at a constant current density of 100 $mA/cm^2$ at 1 ms pulse at 10 Hz for 20 hours to activate the cathode 1000.

The cathode 1000 can also be activated by current or voltage sweeping. In specific embodiments, the emission current of the cathode 1000 can be increased from 0 to 100 $mA/cm^2$ and then back down from 100 $mA/cm^2$ to 0 to complete one sweeping cycle. Sweeping cycles can be repeated for 100 to 500 times to achieve activation, in various embodiments. The taping process serves to fracture the nanomaterial electron emission layer 125 and expose loose ends of nanotubes or nanowires. The repeated electric field exposure can serve to align the nanotubes or nanowires along the electric field direction to improve field enhancement on their emitting ends.

To form a practical field emission cathode, a mesh gate electrode is placed above the field emission cathode to apply an electric field on the nano-emitters to extract electrons from the nano-emitters. The electric field on the nano-emitters is not only closely related to the voltage difference between the mesh gate and the cathode but also depends on the distance between the mesh gate and nano-emitters. The higher the voltage difference, and the smaller the separation, the higher the electric field on the nano-emitters and the higher the emission current that can be drawn from the nano-emitters. To reduce the cost of driving electronics, a small separation distance is often desired. The practical emitter to mesh gate gap distance is <500 μm and preferably <300 μm.

Figure 11:
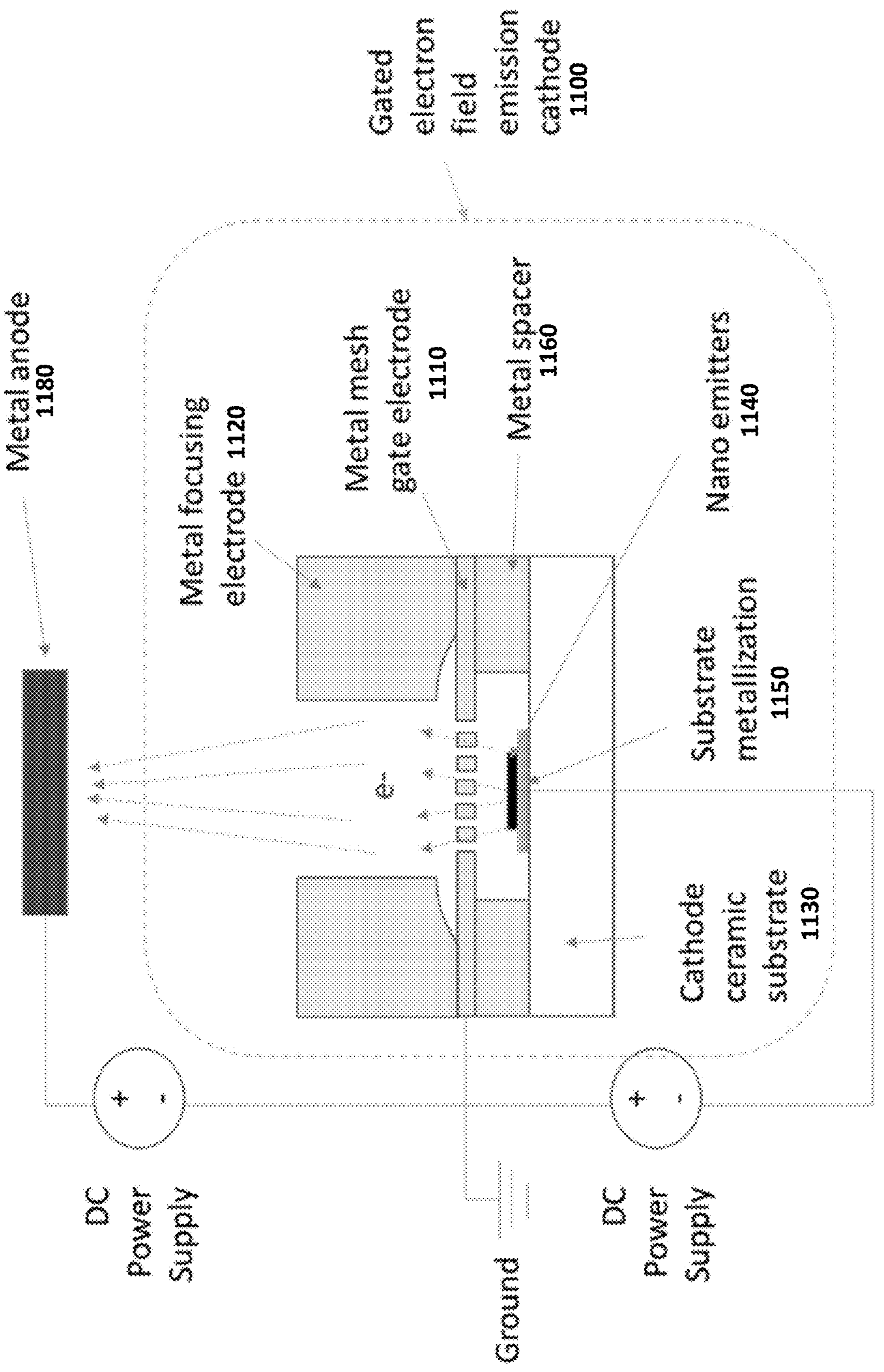
FIG. 11 is a schematic illustration showing an exemplary field emission X-ray tube based on a field emission cathode with an integrated gate and a focusing electrode according to an exemplary embodiment.

FIG. 11 shows one practical design of a nanomaterial (CNT, $LaB_6$ nanowire, or $CeB_6$ nanowire, etc.) based field emission cathode 1100 with an integrated gate 1110 and a focusing electrode 1120. The cathode substrate 1130 is based on a Mo metalized ceramic ($Al_2O_3$) substrate. These nano-emitters 1140 are deposited at a pre-defined position on top of the substrate metallization 1150. A metal spacer 1160 and the mesh gate electrode 1110 are placed sequentially on top of the cathode substrate 1130. The metal spacer 1160 supports the metal mesh gate 1110 and establishes a uniform gap between the nano-emitters 1140 and the mesh gate electrode 1110. The ceramic substrate 1130 insulates the substrate metallization 1150 with nano-emitters 1140 from the metal spacer 1160 and the mesh gate electrode 1110, allowing a DC voltage to be applied between them. In an X-ray tube, an anode 1180 is usually placed well above the gated field emission cathode 1110. The focusing electrode 1120 can be designed and placed on top of the mesh gate electrode 1110 to shape the electron beam profile and achieve a desired focal spot on the anode 1180.

Figure 12:
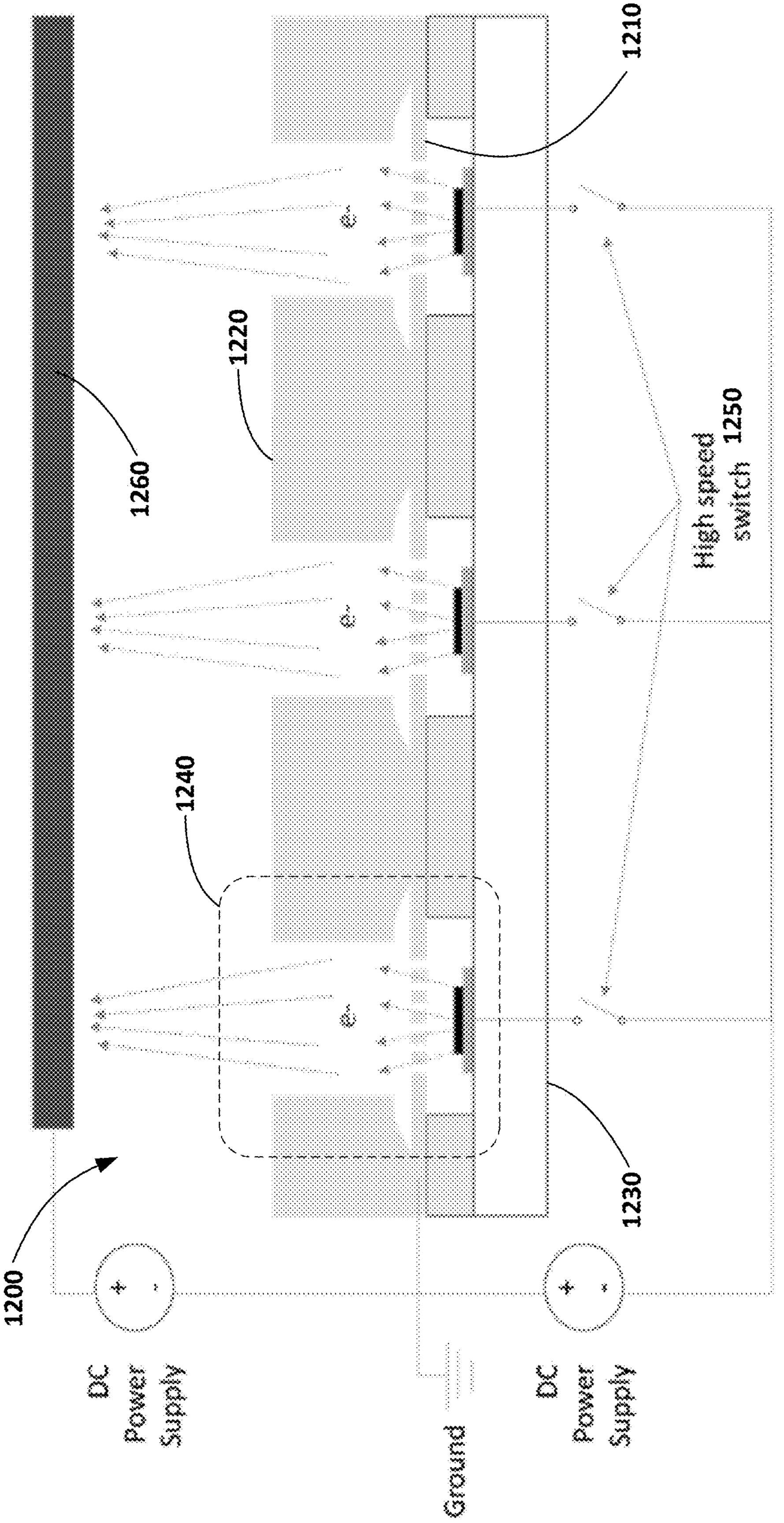
FIG. 12 is a schematic illustration showing a MBX tube based on a multi-pixel field emission cathode with an integrated gate and a focusing electrode according to an exemplary embodiment.

FIG. 12 shows a practical multi-pixel field emission cathode 1200 with an integrated gate 1210 and focusing electrode 1220. Using a patterned deposition method, the multi-pixel cathode 1200 can be produced on one cathode substrate 1230. In the illustrated embodiment, the cathode substrate 1230 has three individual pixels 1240 disposed thereon. Each pixel 1240 has its own switch 1250 and can be turned on and off independently. In an MBX tube, an metal anode 1260 is placed far well above the multi-pixel field emission cathode 1200. Such cathode concepts can also have applications in many other novel multi-source vacuum electronics devices, excluding MBX tubes.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A high current field emission cathode comprising:
- a substrate;
- an electrically resistive layer disposed on the substrate, the electrically resistive layer including a mixture of a nonconductive matrix material and a conductive filler material;
- an adhesion promoting layer disposed on the electrically resistive layer; and
- an electron emissive layer including a nanomaterial and disposed on the adhesion promoting layer.

2. The field emission cathode of claim 1 wherein the matrix material comprises a glass powder and the filler material comprises metallic particles, conductive oxide particles, conductive nanomaterials, or a mixture of thereof.

3. The field emission cathode of claim 1 wherein a weight ratio of the matrix material to the filler material is in range of about 1000:1 to about 1:1.

4. The field emission cathode of claim 1 wherein a weight ratio of matrix material to filler material in a range of about 100:1 to 5:1.

5. The field emission cathode of claim 1 wherein the electrically resistive layer has a thickness less than about 30 μm.

6. The field emission cathode of claim 1 wherein the electrically resistive layer has a sheet resistant in a range from about 10 Ω/square to about 1000 Ω/square.

7. The field emission cathode of claim 1 wherein the adhesion promoting layer comprises a nonconductive material and a nanomaterial, and a weight ratio of the nonconductive material to the nanomaterial is in a range of about 100:1 to about 2:1.

8. The field emission cathode of claim 1 wherein the adhesion promoting layer has a thickness less than 10 μm.

9. The field emission cathode of claim 1 wherein the electron emissive layer comprises a matrix material and a nanomaterial, and a weight ratio of the matrix material to the nanomaterial is in a range from about 1:1000 to about 1:1.

10. The field emission cathode of claim 1, wherein the electron emissive layer has a thickness less than 10 μm.

11. The field emission cathode of claim 1 wherein the adhesion promoting layer and the electron emissive layer also include nonconductive materials, and the nonconductive materials in each of the electrically resistive, adhesion promoting, and electron emissive layers comprise glass powders containing one or more oxides.

12. The field emission cathode of claim 1 wherein the nanomaterial comprises one or more of CNTs, doped CNTs, $CeB_6$ nanowires, and $LaB_6$ nanowires.

13. A method for manufacturing a high current field emission cathode comprising:
- forming an electrically resistive layer on a cathode substrate by
  - forming a first mixture of a nonconductive matrix material and a conductive filler material,
  - depositing the first mixture on the cathode substrate, and
  - heating the deposited first mixture;
- forming an adhesion promoting layer on the electrically resistive layer by
  - forming a second mixture of a nonconductive matrix material and a nanomaterial,
  - depositing the second mixture on the electrically resistive layer, and
  - heating the deposited second mixture;
- forming an electron emissive layer on the adhesion promoting layer by
  - forming a third mixture of a nonconductive matrix material and a nanomaterial,
  - depositing the third mixture on the adhesion promoting layer, and
  - heating the deposited third mixture.

14. The method of claim 13 wherein the electrically resistive layer, adhesion promoting layer, and electron emissive layer are deposited using screen printing, stencil printing, electrophoretic deposition, spray coating, doctor blade coating, or slot die coating.

15. The method of claim 13 wherein each heating includes a first firing cycle in air at a temperature from 80° C. to about 150° C. for up to 30 minutes.

16. The method of claim 15 wherein each heating further includes a second firing cycle, after the first firing cycle, in an inert gas at temperature up to 500° C. for up to 30 minutes.

17. The method of claim 16 wherein each heating further includes a third firing cycle, after the second firing cycle, in a vacuum of at least $1\times10^{-5}$ torr at a temperature up to about 1500° C. for up to about 3 hours.

18. The method of claim 13, wherein the electrically resistive layer, the adhesion promoting layer, and the electron emissive layer are patterned on the substrate to form a plurality of islands separated by gaps therebetween, the islands being no greater than 0.3 $cm^2$ in diameter.

19. The method of claim 18, wherein the gaps between the islands are in a range of about 0.1 mm to about 0.5 mm.

* * * * *